United States Patent [19]

Eichenauer et al.

[11] Patent Number: 4,772,668
[45] Date of Patent: Sep. 20, 1988

[54] SULPHUR-CONTAINING GRAFT PRODUCTS

[75] Inventors: Herbert Eichenauer, Dormagen; Alfred Pischtschan, Kuerten; Karl-Heinz Ott, Leverkusen, all of Fed. Rep. of Germany

[73] Assignee: Bayer Aktiengesellschaft, Leverkusen, Fed. Rep. of Germany

[21] Appl. No.: 827,390

[22] Filed: Feb. 10, 1986

[30] Foreign Application Priority Data

Feb. 20, 1985 [DE] Fed. Rep. of Germany ....... 3505778

[51] Int. Cl.$^4$ .............................................. C08L 51/04
[52] U.S. Cl. .................... 525/261; 525/310; 525/316; 525/315
[58] Field of Search ............... 526/224; 525/261, 310, 525/316, 244, 315

[56] References Cited

U.S. PATENT DOCUMENTS

| 3,828,013 | 8/1974 | Nield | 526/224 |
| 3,915,942 | 10/1975 | Tamura | 526/224 |
| 4,082,818 | 4/1978 | Coffey et al. | 526/224 |
| 4,246,382 | 1/1981 | Honda et al. | 526/224 |
| 4,510,287 | 4/1985 | Wu | 525/86 |
| 4,587,313 | 5/1986 | Ohta et al. | 526/224 |

Primary Examiner—Allan M. Lieberman
Attorney, Agent, or Firm—Connolly & Hutz

[57] ABSTRACT

Sulphur-containing elastic-thermoplastic graft products of styrene, α-methyl styrene, p-methyl styrene, vinyl toluene, acrylonitrile or methyl methacrylate or mixtures thereof on a particle-like rubber with an average particle diameter ($d_{50}$) of from 0.05 to 20.0 μm and a glass temperature $\leq 10°$ C. with a total rubber content of from 1 to 80% by weight, whereby the graft products have a sulphur content of from 1.15 to 3.95% by weight and the thermoplast proportion of the polymerized monomers on the particle-like rubber has a limiting viscosity of from 2 to 15 ml/g (measured in dimethyl formamide at 25° C.) and in which at least 90% by weight of the incorporated sulphur is present as a constituent of terminal C1-18-thioalkyl groups.

11 Claims, No Drawings

SULPHUR-CONTAINING GRAFT PRODUCTS

The present invention provides sulphur-containing elastic-thermoplastic graft products with terminal thioalkyl groups which have a sulphur content of from 1.15 to 3.95% by weight and the thermoplast proportion of the polymerised monomers on the rubber has a limiting or as it is commonly referred to intrinsic viscosity of from 2 to 15 ml/g (measured in, dimethyl formamide, hereafter "DMF", at 25° C.).

ABS polymers have a good property combination of high impact strength, good chemical-resistance and easy processibility. In spite of this, in special cases, such as with ABS mixtures with a high rubber content, a flowability of the thermoplastic material can result which is in practice insufficient for the demands of modern processing technology. Remedy through addition of low molecular weight flow auxilaries such as ethylene diamine bisstearoyl amide or calcium stearate often results in strength losses, reduced dimensional stability under heat or migration of the added lubricant.

An improvement in the flowability by increasing the processing temperature can usually only be obtained at the cost of a partial thermooxidative degradation in the rubber phase.

The need thus existed for a thermosplastic material which can be used to improve the flowability of ABS thermoplast resins, which has no negative influences on the ABS properties, particularly strength and dimensional stability under heat, and which opposes a thermooxidative decomposition of the rubber phase.

The invention provides sulphur-containing elastic-thermoplastic graft products of styrene, α-methyl styrene, p-methyl styrene, vinyl toluene, acrylonitrile or methyl methacrylate or mixtures thereof on a particle-like rubber with an average particle diameter ($d_{50}$) of from 0.05 to 20.0 μm, preferably from 0.1 to 1.0 μm and a glass or as it is commonly referred to glass transition temperature $\leq 10°$ C. with a total rubber content of from 1 to 80% by weight, preferably from 10 to 60% by weight, whereby the graft products have a sulphur content of from 1.15 to 3.95% by weight, preferably from 1.25 to 2.40% by weight, the thermoplast proportion of the polymerised monomers on the particle-like rubber having a limiting or intrinsic viscosity of from 2 to 15 ml/g, preferably from 3 to 12 ml/g (measured in DMF at 25° C.) and in which at least 90% by weight of the incorporated sulphur is present as a constituent of terminal $C_{1-18}$-thioalkyl groups.

Preferred sulphur-containing graft products are those which have a good compatibility with ABS polymers, particularly products which are obtained by copolymerisation or terpolymerisation of (nuclear or side-chain substituted) styrene-containing monomer mixtures in the presence of a polybutadiene.

The production of the polymers according to the invention can take place in a known manner by solution-suspension-or emulsion polymerisation or by a combination of these processes, the polymerisation in emulsion is preferred.

This is preferably carried out using anionic emulsifiers such as sodium, potassium or ammonium salts of long-chain fatty acids having from 10 to 20 carbon atoms, for example potassium oleate, alkyl sulphates having from 10 to 20 carbon atoms, alkyl sulphates having from 10 to 20 carbon atoms or alkali or ammonium salts of disproportionated abietic acid.

The graft reaction can be carried out in a wide temperature range, it preferably takes place between 30° C. and 100° C., particularly preferably between 50° C. and 80° C.

Suitable radical-forming initiators are organic and inorganic peroxides, inorganic persulphates such as potassium persulphate, azoinitiators such as azobisisobutyronitrile, as well as redox systems which consists of an oxidizing agent, preferably a peroxide, and a reducing agent.

Potassium persulphate is used as a preferred initiator, the quantities for use are between 0.1 and 0.5% by weight.

Particle-like rubbers present in emulsion form are used as rubber bases and have an average particle diameter ($d_{50}$) of from 0.05 to 20.0 μm, preferably from 0.1 to 1.10 μm, and a glass temperature $\leq 10°$ C. Examples of rubbers which can be used are polybutadiene polyisoprene, styrenebutadiene copolymers, acrylonitrile-butadiene copolymers, acrylate rubbers, EPM rubbers (ethylene/propylene rubbers) and EPDM rubbers (ethylene/propylene/diene rubbers which contain a non-conjugated diene such as hexa-1,5-diene or norborna diene in small quantities as the diene). The average particle diameters are determined by means of ultra-centrifuge (c.f. W. Scholtan, H. Lange: Kolloid-Z. u. Z. Polymere 250 p. 782–796 (1972)).

The introduction of the terminal thioalkyl groups takes place by graft reaction of a mixture of monomers and $C_{1-18}$-alkylmercaptan in the presence of the graft rubber base, whereby the mercaptan acting as a chain transferrer is incorporated as a terminal thioalkyl group.

The sulphur content introduced by the terminal thioalkyl groups must thereby be at least 90% by weight of the total sulphur present in the polymer. The content of sulphur possibly still present in the polymer, introduced, for example, by incorporation of initiator fragments or by graft reaction of sulphur-containing emulsifiers is less than 10% by weight of the total sulphur content in the polymer.

Examples of $C_{1-18}$-alkyl mercaptans which can be used are ethyl mercaptan, n-propyl mercaptan, n-butyl mercaptan, tert.-butyl mercaptan, n-pentyl mercaptan, n-hexyl mercaptan, n-octyl mercaptan, n-decyl mercaptan, n-dodecyl mercaptan, tert.-dodecyl mercaptan, n-hexadecyl mercaptan and n-octadecyl mercaptan.

Preferred alkyl mercaptans are tert.-dodecyl mercaptan and n-dodecyl mercaptan or mixtures thereof.

The graft products have a rubber content of from 1 to 80% by weight, particularly from 10 to 60% by weight, the gel contents, measured in acetone at 25° C., are from 5 to 95% by weight, particularly from 20 to 80% by weight.

The limiting viscosity of the thermoplast proportion of the polymerised monomers or the particle-like rubber is, according to the investigations by Dinges et. al.; (Makromol. Chemie 101, p. 200–213 (1967)) identical to the limiting viscosity of the non-chemically bound polymer materials "simultaneously" arising in the graft reaction, so that the determination of the limiting viscosity is simpler to undertake on this soluble material.

Sulphur-containing graft polymer of this invention can be prepared by a grafting reaction of a mixture of (Ia) from 50 to 80 parts by weight, preferably from 55 to 75 parts by weight of (α-methyl)styrene and/or p-methyl styrene or vinyl toluene, (Ib) from 10 to 30 parts by weight, preferably from 15 to 27.5 parts by weight of (meth)acrylonitrile and (Ic) as many parts by weight of a $C_{1-18}$-alkyl mercaptan or mixtures thereof as produce a sulphur content of from 1.15 to 3.95% by weight in the polymer, on (Id) from 10 to 200 parts by weight of polybutadiene. Usually, for component Ic), it is sufficient to use from 7.5 to 25 parts by weight, preferably from 8 to 15 parts by weight of tert.-dodecyl mercaptan and/or n-dodecyl mercaptan or mixtures thereof.

Sulphur-containing graft polymer of this invention also is produced by graft reaction of a mixture of (IIa) from 25 to 75 parts by weight, preferably from 30 to 70 parts by weight of ($\alpha$-methyl)styrene and/or p-methyl styrene or vinyl toluene, (IIb) from 25 to 75 parts by weight, preferably from 30 to 70 parts by weight of methyl methacrylate and (IIc) as many parts by weight of a $C_{1-18}$-alkyl mercaptan or mixtures thereof as produce a sulphur content of from 1.15 to 3.95% by weight in the polymer, on (IId) from 10 to 200 parts by weight of polybutadiene. Usually, for component (IIc), it is sufficient to use from 7.5 to 25 parts by weight, preferably from 8 to 15 parts by weight of tert.-dodecyl mercaptan and/or n-dodecyl mercaptan or mixtures thereof.

Sulphur-containing graft polymer of this invention also is produced by graft reaction of a mixture of (IIIa) from 10 to 60 parts by weight, preferably from 20 to 50 parts by weight of ($\alpha$-methyl)styrene and/or p-methyl styrene or vinyl toluene, (IIIb) from 10 to 60 parts by weight, preferably from 20 to 50 parts by weight of methacrylate, (IIIc) from 10 to 30 parts by weight, preferably from 5 to 27.5 parts by weight of (meth)acrylonitrile and (IIId) as many parts by weight of a C1-18-alkyl mercaptan or mixtures thereof as produce a sulphur content of from 1.15 to 3.95% by weight in the polymer, on (IIIe) from 10 to 200 parts by weight of polybutadiene. Usually for component (IIId), it is sufficient to use from 7.5 to 25 parts by weight, preferably from 8 to 15 parts by weight of tert.-dodecyl mercaptan and/or n-dodecyl mercaptan or mixtures thereof.

Sulphur-containing graft polymer of this invention also is produced by graft reaction of a mixture of (IVa) from 50 to 80 parts by weight, preferably from 55 to 75 parts by weight of methyl methacrylate, (IVb) from 10 to 30 parts by weight of (meth)acrylonitrile and (IVc) as many parts by weight of a $C_{1-18}$-alkyl mercaptan or mixtures thereof as produce a sulphur content of from 1.15 to 3.95% by weight in the polymer, on (IVd) from 10 to 200 parts by weight of polybutadiene. Usually, for component (IVc), it is sufficient to use from 7.5 to 25 parts by weight, preferably from 8 to 15 parts by weight of tert.-dodecyl mercaptan and/or n-dodecyl mercaptan or mixtures thereof.

Thus, the invention also relates to a process for the production of sulphur-containing elastic-thermoplastic graft products of styrene, $\alpha$-methyl styrene, p-methyl styrene, vinyl toluene, acrylonitrile or methyl methacrylate or mixtures thereof on a particle-like rubber with an average particle diameter ($d_{50}$) of from 0.05 to 20.0 $\mu$m and a glass temperature $\leq 10°$ C. with a total rubber content of from 1 to 80% by weight, whereby the thermoplast proportion of the monomers polymerized on the particlelike rubber has a limiting viscosity of from 2 to 15 ml/g (measured in dimethylformamide at 25° C.), characterized in that the graft reaction is polymerized in the presence of a $C_{1-18}$-alkyl mercaptan or mixtures thereof in quantities of from $(0.503 .x + 1.222)$ % by weight to $(1.728 .x + 4.197)$ % by weight (based on the sum of rubber base, monomer and mercaptan quantity), whereby x represents the number of carbon atoms in the alkly mercaptan.

The sulphur-containing graft products according to the invention, the thermoplast proportion of the polymerised monomers on the particle-like rubber of which has a limiting viscosity of from 2 to 15 ml/g (measured in DMF at 25° C.), are suitable as an agent for improving the flowability of ABS polymers in thermoplastic processing. They are thereby added to the ABS polymers in quantities of from 0.5 to 15% by weight, preferably from 1 to 10% by weight and particularly preferably from 1.5 to 7.5% by weight. Owing to their content of terminal thioalkyl groups, they are, on the one hand, very effective as oxygen catchers, whereby the thioether grouping is converted into sulphoxide or sulphone groupings, on the other hand, the alkyl group, particularly a longer-chain grouping such as a dodecyl radical, contributes to an increased effectiveness as flowability improver. Thus, the sulphur-containing graft polymer of this invention is also used for ptotection of ABS polymers against thermooxidative damage.

Thermoplastic mixtures containing sulphur-containing graft polymers are also part of the present invention. Those include thermoplastic mixtures containing graft polymers (A), copolymers (B) and graft products (C), characterised in that they contain a sulphur-containing elastic-thermoplast graft product of styrene, $\alpha$-methyl styrene p-methyl styrene, vinyl toluene, acrylonitrile or methyl metacrylate or mixtures thereof on a particlelike rubber with an average particle diameter ($d_{50}$) of from 0.05 to 20.0 $\mu$m and a glass temperature 10° C. with a total rubber content of from 1 to 80% by weight, with a sulphur content, introduced via terminal $C_{1-18}$-thioalkyl groups, of from 1.15 to 3.95% by weight and a limit viscosity of the thermoplastic proportion polymerised on the particle-like rubber, of from 2 to 15 ml/g (measured in dimethyl formamide at 25° C.) in quantities of from 0.5 to 15 parts by weight, based in each case on 100 parts by weight of the mixture of graft polymers (A), copolymers (B) and graft products (C). Graft products (C) are produced by polymerizing a mixture of (Va) from 50 to 80 parts by weight, preferably from 55 to 75 parts by weight of ($\alpha$-methyl)styrene and/or p-methyl styrene or vinyl toluene, (Vb) from 10 to 30 parts by weight, preferably from 15 to 27.5 parts by weight of (meth)acrylonitrile and (Vc) from 7.5 to 25 parts by weight, preferably from 8 to 15 parts by weight of tert.-dodecyl mercaptan and/or n-dodecyl mercaptan or mixtures thereof on (Vd) from 10 to 200 parts by weight of polybutadiene. Especially suitable thermoplastic mixtures contain as component (A) and copolymers (B)

(A) from 5 to 80 parts by weight of a graft polymer consisting of (A)(1) from 5 to 90 parts by weight of a mixture of (A)(1)(1) from 50 to 90% by weight of styrene, $\alpha$-methylstyrene, nuclear-substituted styrene, methyl methacrylate or mixtures thereof and (A)(1)(2) from 50 to 10% by weight of (meth)acrylonitrile, methyl methacrylate, N-substituted maleimide or mixtures thereof, on (A)(2) from 95 to 10 parts by weight of a rubber with a glass temperature $\leq 10°$ C., and (B) from 5 to 95 parts by weight of a thermoplastic coplymer with a $\overline{M}_w$ of from 15 000 to 200 000 (measured by light scatter or sedimentation) consisting of (B)(1) from 50 to 95% by weight of styrene, α-methyl styrene, nuclear-substituted styrene, methyl methacrylate or mixtures thereof, and (B)(2) from 50 to 5% by weight of (meth)acrylonitrile, methyl methacrylate, maleic acid anhydride, N-substituted maleimide or mixtures thereof, whereby the sum of the parts by weight of graft polymer (A), copolymer (B) and graft product (C) is in each case again 100.

EXAMPLES

The invention is explained in more detail in the following Examples. The given parts are parts by weight and in each case relate to solid constituents or polymerisable constituents.

EXAMPLE 1

50 parts of polybutadiene (in the form of a latex with a solids content of 25% by weight) with an average particle size of 0.4 μm are heated to 65° C. under nitrogen, whereupon 0.5 parts of potassium persulphate (dissolved in 20 parts of water) are added. A mixture of 25.2 parts of styrene, 9.8 parts of acrylonitrile and 15 parts of tert.-dodecylmercaptan as well as 2 parts of the sodium salt of the disproportionated abietic acid (dissolved in 25 parts of water) are metered in over 4 hours whereby the graft reaction takes place. After a period of secondary reaction, the latex is coagulated in a cold magnesium sulphate/acetic acid solution. The polymer obtained after drying at 70° C., under vacuum, in a yield of 96%, has a sulphur content of 2.25%.

The polymer is then extracted for 24 hours in a Soxhlet apparatus with methyl ethyl ketone. The solution is concentrated, whereupon the solvent is completely removed under vacuum. The remaining polymer has a limiting viscosity of 5.4 ml/g (measured in DMF at 25° C.).

EXAMPLE 2

20 parts of polybutadiene (in the form of a latex with a solids content of 11.5% by weight) with an average particle size of 0.4 μm are heated to 65° C. under nitrogen, whereupon 0.5 parts of potassium persulphate (dissolved in 20 parts of water) are added. A mixture of 46.8 parts of styrene, 18.2 parts of acrylonitrile and 15 parts of tert.-dodecyl mercaptan as well as 2 parts of the sodium salt of the disporportionated abietic acid (dissolved in 25 parts of water) are then metered in over 4 hours, whereby the graft reaction takes place. After a period of secondary reaction the latex is coagulated in a cold magnesium sulphate/acetic acid solution. The polymer obtained after drying at 70° C., under vacuum, in a yield of 97%, has a sulphur content of 2.3%.

The polymer is then extracted for 24 hours in a Soxhlet apparatus with methyl ethyl ketone. The solution is concentrated, whereupon the solvent is completely removed under vacuum. The remaining polymer has a limiting viscosity of 6.1 ml/g (measured in DMF at 25° C.).

EXAMPLE 3

An ABS polymer, consisting of 40 parts by weight of a graft polymer of 36 parts by weight of styrene and 14 parts by weight of acrylonitrile on 50 parts by weight of a polybutadiene with an average particle diameter ($d_{50}$) of 0.3 μm and 60 parts by weight of a styrene-acrylonitrile copolymer consisting of 72 parts by weight of styrene and 28 parts by weight of acrylonitrile with a $M_w$ value of about 80 000 ($M_w/M_n-1 \leq 2.0$) were treated with 5 parts by weight of the polymer in Example 1 and processed at 240° C. by injection moulding to a spiral of about 8mm in width and about 2 mm in depth. The length of the spiral was 52 cm.

DSC measurements on the pulverulent ABS polmer using a DSC 2 measuring apparatus by the firm Perkin-Elmer produced in the isothermic measurement at 160° C. (rinsing gas oxygen 3.6 l/h) an induction time up to the maximum oxidation rate of 70.5 min. With the dynamic measurement (rinsing gas oxygen 3.6 l/h, heating rate 20 k/min) the maximum of the exothermic reaction was T=217° C.

EXAMPLE 4

(Comparison)

The ABS polymer described in Example 3 was processed under the same conditions without addition of the polymer in Example 1. The length of the spiral was 47 cm.

DSC measurements under the same conditions resulted for the isothermic measurement at 160° C. in an induction time up to the maximum oxidation rate of 3.8 min. With the dynamic measurement, the maximum of the exothermic reaction was T=190.5° C.

We claim:

1. Sulphur-containing elastic-thermoplastic graft products of a monomer mixture grafted on a particle-like rubber with an average diameter ($d_{50}$) of from 0.05 to 20.0 μm and a glass transition temperature lower than 10° C. with a total rubber content of from 1 to 80% by weight, wherein the graft products have a sulphur content of from 1.15 to 3.95% by weight and the thermoplast proportion of the polymerized monomers on the particle-like rubber has an intrinsic viscosity of from 2 to 15 ml/g, measured in dimethyl formamide at 25° C., and in which at least 90% by weight of the incorporated sulphur is present as a constituent of terminal $C_{1-18}$-thioalkyl groups, said monomer mixture comprising (a) from 50 to 80 parts by weight of styrene, α-methyl styrene, p-methyl styrene, a mixture of α-methyl styrene and p-methyl styrene, or vinyl toluene, (b) from 10 to 30 parts by weight of (meth)acrylonitrile and (c) as many parts by weight of a $C_{1-18}$-alkyl mercaptan or mixtures thereof as produces a sulphur content of from 1.15 to 3.95% by weight in the polymer.

2. Sulphur-containing elastic-thermoplastic graft product according to claim 1 wherein from 50 to 80 parts by weight of (a), from 10 to 30 parts by weight of (b) and as (c) 7.5 to 25 parts by weight of tert.-dodecyl mercaptan, n-dodecyl mercaptan or mixtures thereof are grafted on from 10 to 200 parts by weight of styrene polybutadiene.

3. Sulphur-containing elastic-thermoplastic graft products of a monomer mixture grafted on a particle-like rubber with an average diameter ($d_{50}$) of from 0.05 to 20.0 μm and a glass transition temperature lower than 10° C. with a total rubber content of from 1 to 80% by weight, wherein the graft products have a sulphur content of from 1.15 to 3.95% by weight and the thermoplast proportion of the polymerized monomers on the particle-like rubber has an intrinsic viscosity of from 2 to 15 ml/g, measured in dimethyl formomide at 25° C., and in which at least 90% by weight of the incorporated sulphur is present as a constituent of terminal $C_{1-8}$-thioalkyl groups, said monomer mixture comprising (a) from 25 to 75 parts by weight of styrene, α-methyl styrene, p-methyl styrene, a mixture of α-methylene sytrene and p-methyl styrene, or vinyl toluene, (b) from 25 to 75 parts by weight of methyl methacrylate, and (c) as many parts by weight of a $C_{1-18}$-alkyl mercaptan or mixtures thereof as produce a sulphur content of from 1.15 to 3.95% by weight in the polymer.

4. Sulphur-containing elastic-thermoplastic graft product according to claim 3 wherein from 25 to 75 parts by weight of (a), from 25 to 75 parts by weight of (b) and as (c) 7.5 to 25 parts by weight of tert.-dodecyl mercaptan, n-dodecyl mercaptan or mixtures thereof are grafted on from 10 to 200 parts by weight of polybutadiene.

5. A sulphur-containing elastic-thermoplastic graft product of a monomer mixture grafted on a particle-like rubber with an average diameter ($d_{50}$) of from 0.05 to 20.0 μm and a glass transition temperature lower than 10° C. with a total rubber content of from 1 to 80% by weight, wherein the graft product has a sulphur content of from 1.15 to 3.95% by weight and the thermoplast proportion of the polymerized monomers on the particle-like rubber has an intrinsic viscosity of from 2 to 15 ml/g, measured in dimethyl formamide at 25° C., and in which at least 90% by weight of the incorporated sulphur is present as a constituent of terminal $C_{1-18}$-thioalkyl groups, said monomer mixture comprising (a) from 10 to 60 parts by weight of styrene,α-methyl styrene, p-methyl styrene, a mixture of styrene,α-methyl styrene and p-methyl styrene, or vinyl toluene, (b) from 10 to 60 parts by weight of methyl methacrylate, and from 10 to 30 parts by weight of (meth)acrylonitrile, (c) as many parts by weight of a $C_{1-18}$-alkyl mercaptan or mixtures thereof as produce a sulphur content of from 1.15 to 3.95% by weight in the polymer.

6. Sulphur-containing elastic-thermoplastic graft products according to claim 5 wherein the monomer mixture comprises from 10 to 60 parts by weight of (a), from 10 to 60 parts by weight of (b) and as (c) 7.5 to 25 parts by weight of tert.-dodecyl mercaptan, n-dodecyl mercaptan or mixtures thereof.

7. Sulphur-containing elastic-thermoplastic graft products of a monomer mixture grafted on a particle-like rubber with an average diameter ($d_{50}$) of from 0.05 to 20.0 μm and a glass transition temperature lower than 10° C. with a total rubber content of from 1 to 80% by weight, wherein the graft products have a sulphur content of from 1.15 to 3.95% by weight and the thermoplast proportion of the polymerized monomers on the particle-like rubber has an intrinsic viscosity of from 2 to 15 ml/g, measured in dimethyl formamide at 25° C., and in which at least 90% by weight of the incorporated sulphur is present as a constituent of terminal $C_{1-18}$-thioalkyl groups, said monomer mixture comprising (a) from 50 to 80 parts by weight of methyl methacrylate, (b) from 10 to 30 parts by weight of (meth)acrylonitrile and (c) as many parts by weight of a $C_{1-18}$-alkyl mercaptan or mixtures thereof as produce a sulphur content of from 1.15 to 3.95% by weight in the polymer.

8. Sulphur-containing elastic-thermoplastic graft product according to claim 7 wherein from 50 to 80 parts by weight of (a), from 10 to 30 parts by weight of (b) and as (c) 7.5 to 25 parts by weight of tert.-dodecyl mercaptan, n-dodecyl mercaptan or mixtures thereof grafted on from 10 to 200 parts by weight of polybutadiene.

9. A process for the production of a sulphur-containing elastic thermoplatic graft product according to claim 1 which has a total rubber content of from 1 to 80% by weight, comprising graft polymerizing the monomer mixture onto a particulate rubber with an average particle diameter ($d_{50}$) of from 0.05 to 20.0 μm and a glass transition temperature less than or equal to 10° C. whereby the thermoplast portion of the monomer mixture polymerized onto the particulate rubber has an intrinsic viscosity of from 2 to 15 ml/g measured in the dimethylformamide at 25° C., wherein the graft polymerization is effected in the presence of one or more $C_1$–$C_{18}$-alkyl mercaptans in an amount ranging from $0.503 X + 1.222\%$ by weight of $1.728 X + 4.197\%$ by weight based on the combined weight of the particulate rubber, monomer mixture and alkyl mercaptan and wherein X represents the number of carbon atoms in the alkyl mercaptan.

10. A process for the production of a sulphur-containing elastic thermoplastic graft product according to claim 3 which has a total rubber content of from 1 to 80% by weight, comprising graft polymerizing the monomer mixture onto a particulate rubber with an average particle diameter ($d_{50}$) of from 0.05 to 20.0 μm and a glass transition temperature less than or equal to 10° C. whereby the thermoplast portion of the monomer mixture polymerized onto the particulate rubber has an intrinsic viscosity of from 2 to 15 ml/g measured in dimethylformamide at 25° C., wherein the graft polymerization is effected in the presence of one or more $C_1$–$C_{18}$-alkyl mercaptans in an amount ranging from $0.503 X + 1.222\%$ by weight to $1.728 X + 4.197\%$ by weight based on the combined weight of the particulate rubber, monomer mixture and alkyl mercaptan and wherein X represents the number of carbon atoms in the alkyl mercaptan.

11. A process for the production of a sulphur-containing elastic thermoplastic graft product according to claim 7 which has a total rubber content of from 1 to 80% by weight, comprising graft polymerizing the monomer mixture onto a particulate rubber with an average particle diameter ($d_{50}$) of from 0.05 to 20.0 μm and a glass transition temperature less than or equal to 10° C. whereby the thermoplast portion of the monomer mixture polymerized onto the particulate rubber has an intrinsic viscosity of from 2 to 15 ml/g measured in dimethylformamide at 25° C., wherein the graft polymerization is effected in the presence of one or more $C_1$–$C_{18}$-alkyl mercaptans in an amount ranging from $0.503 X + 1.222\%$ by weight to $1.728 X + 4.197\%$ by weight based on the combined weight of the particulate rubber, monomer mixture and alkyl mercaptan and wherein X represents the number of carbon atoms in the alkyl mercaptan.

* * * * *